(12) United States Patent
Karssemeijer et al.

(10) Patent No.: US 7,203,348 B1
(45) Date of Patent: Apr. 10, 2007

(54) METHOD AND APPARATUS FOR CORRECTION OF MAMMOGRAMS FOR NON-UNIFORM BREAST THICKNESS

(75) Inventors: Nicolaas Karssemeijer, Beek (NL); Alexander Caldwell Schneider, Sunnyvale, CA (US)

(73) Assignee: R2 Technology, Inc., Sunnyvale, CA (US)

( * ) Notice: Subject to any disclaimer, the term of this patent is extended or adjusted under 35 U.S.C. 154(b) by 516 days.

(21) Appl. No.: 10/054,437

(22) Filed: Jan. 18, 2002

(51) Int. Cl.
*G06K 9/00* (2006.01)

(52) U.S. Cl. ............ 382/128; 382/170; 382/287; 382/289; 382/294

(58) Field of Classification Search .......... 382/128, 382/131, 132, 168, 170, 289, 296, 269, 287, 382/294; 128/923; 600/300; 435/29; 356/39; 377/10; 350/363.07
See application file for complete search history.

(56) References Cited

U.S. PATENT DOCUMENTS

| | | | | |
|---|---|---|---|---|
| 5,003,979 | A * | 4/1991 | Merickel et al. | 600/410 |
| 5,657,362 | A * | 8/1997 | Giger et al. | 378/37 |
| 5,872,859 | A * | 2/1999 | Gur et al. | 382/128 |
| 6,278,793 | B1 * | 8/2001 | Gur et al. | 382/128 |
| 6,282,305 | B1 * | 8/2001 | Huo et al. | 382/128 |
| 6,351,549 | B1 * | 2/2002 | Souluer | 382/131 |
| 6,400,837 | B2 * | 6/2002 | Souluer | 382/128 |
| 6,421,454 | B1 * | 7/2002 | Burke et al. | 382/131 |
| 6,718,056 | B1 * | 4/2004 | Bothorel et al. | 382/132 |
| 6,990,222 | B2 * | 1/2006 | Arnold | 382/131 |
| 2001/0031076 | A1 * | 10/2001 | Campanini et al. | 382/128 |
| 2001/0043730 | A1 * | 11/2001 | Souluer | 382/128 |
| 2002/0062075 | A1 * | 5/2002 | Takeo | 600/407 |
| 2003/0169915 | A1 * | 9/2003 | Takeo | 382/132 |
| 2004/0213447 | A1 * | 10/2004 | Roehrig et al. | 382/132 |
| 2004/0234113 | A1 * | 11/2004 | Miga | 382/128 |

* cited by examiner

*Primary Examiner*—Matthew C. Bella
*Assistant Examiner*—Barry Choobin
(74) *Attorney, Agent, or Firm*—Blakely, Sokoloff, Taylor & Zafman, LLP; Judith A. Szepesi (57) ABSTRACT

A method and apparatus for correcting for a distortion in a mammogram. The method comprises classifying pixels as either likely fat or likely not-fat. The method further comprises identifying a candidate distortion and calculating a histogram of the likely fat and the likely not-fat pixels at the candidate distortion. The method further comprises evaluating a quality of the candidate distortion based on features of the histograms of pixel values in the fat and dense tissue classes. The distortion may be a two dimensional tilt of the plates or a three dimensional deformation of the plates as in a bend.

25 Claims, 11 Drawing Sheets

METHOD AND APPARATUS FOR CORRECTION OF MAMMOGRAMS FOR NON-UNIFORM BREAST THICKNESS

FIELD OF THE INVENTION

The present invention relates to medical imaging, and more specifically, to tilt correction in a mammogram.

BACKGROUND

Mammograms are generally obtained by pressing the breast between two plates of imaging radiation transparent material, and taking an image of the compressed breast tissue. The image may be X-ray or another type of image. In theory, the two plates should be parallel to take a perfect quality picture. However, in reality, the pectoral muscle and tissue inhomogeneity affect the shape of the compressed breast, by keeping the two plates from being parallel.

Figure 1A:
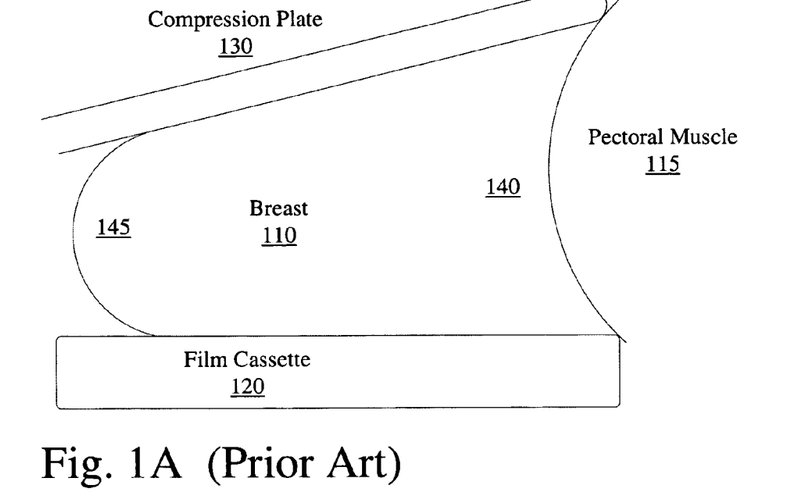
FIG. 1A is an illustration of the shape of a compressed breast in the craniocaudal view.

FIG. 1A illustrates one example of the breast tissue 110 compressed between the film cassette 120 and compression plate 130 from the cranial caudal view. As can be seen, the two plates 120, 130 are not parallel. This results in a lighter 140 and darker 145 region of the image.

Figure 1B:
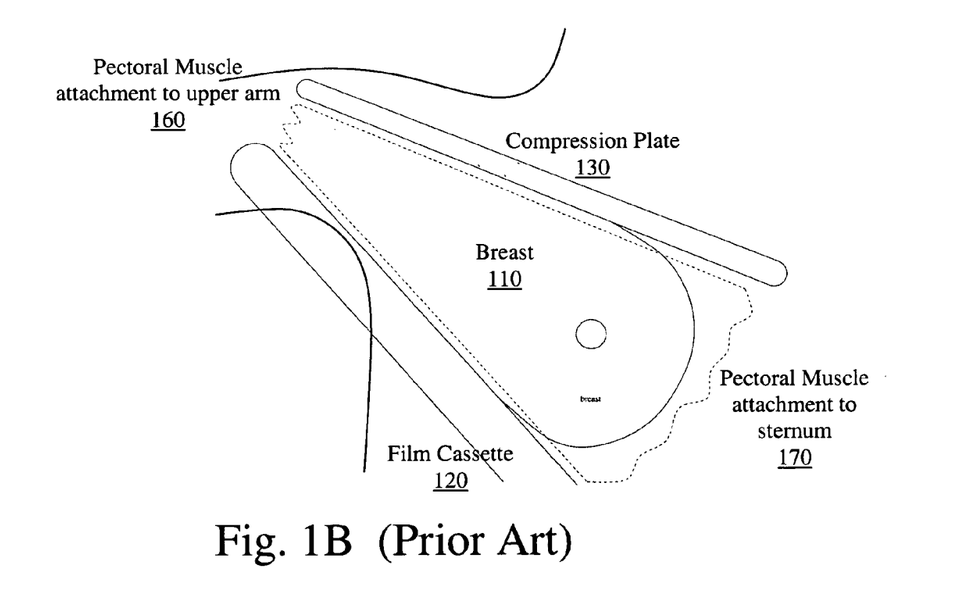
FIG. 1B is an illustration of the shape of a compressed breast in the mediolateral oblique view.

Similarly, FIG. 1B illustrates the mediolateral oblique view of the compressed breast, showing that the pectoral muscle attachments 160, 170 cause the two plates 120, 130 to not be parallel. Because the image derived is a two-dimensional image, the increased thickness of the breast tissue results in a gray-scale differential between the areas of the breast.

Such a change in the relative color of the image reduces the accuracy of abnormality detection. Therefore, a system that corrects for the tilt, without requiring alteration of the existing structures would be advantageous.

SUMMARY OF THE INVENTION

A method and apparatus for correcting for a distortion in a mammogram. The method comprises classifying pixels as either likely fat or likely not-fat. The method further comprises identifying a candidate distortion and calculating a histogram of the likely fat and the likely not-fat pixels at the candidate distortion. The method further comprises evaluating a quality of the candidate distortion based on features of the histograms of pixel values in the fat and dense tissue classes. The distortion may be a two dimensional tilt of the plates or a three dimensional deformation of the plates as in a bend.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for correcting distortion in a mammogram image is described. Such a distortion may be introduced by a tilt in the plates used to take a mammogram, or a bend or other distortion in the plates. For simplicity, the case of a tilt will be discussed in greater detail herein. However, one of sill in the art would be able to send this to a non-linear correction, such as a 2nd order correction.

The relative tilt between the compression plates when a mammogram is acquired introduces a trend that tends to make pixel values change predictably across the breast. Given that pixel value in log (exposure) images varies roughly linearly with the line integral of density between the pixel and the focal spot of the X-ray tube, it can be assumed that tilt between the compression plates appears as a linear trend in pixel value depending on position in the image plane. This trend is most obvious in the intensities of pixels that are covered by almost pure fat between the compression plates (known as "compressed fat", contrasted with "uncompressed fat" pixels which are covered by a combination of fat and air). In a mammogram taken with parallel compression plates, all compressed fat pixels should have the same pixel value (neglecting other influences such as the heel effect and the angle of incidence of the X-rays on the screen/film plane).

If the slope of the tilt is estimated, a wedge of density with a canceling tilt can be added to the pixel values of the image, simulating a mammogram taken with parallel compression plates. This estimation can be done by using fat/dense segmentation and optimizing its performance by varying the compensation tilt while monitoring a measure of the quality of the segmentation. Similarly, for a three-dimensional correction, a shape of the appropriate density designed to cancel the distortion may be added.

Figure 2:
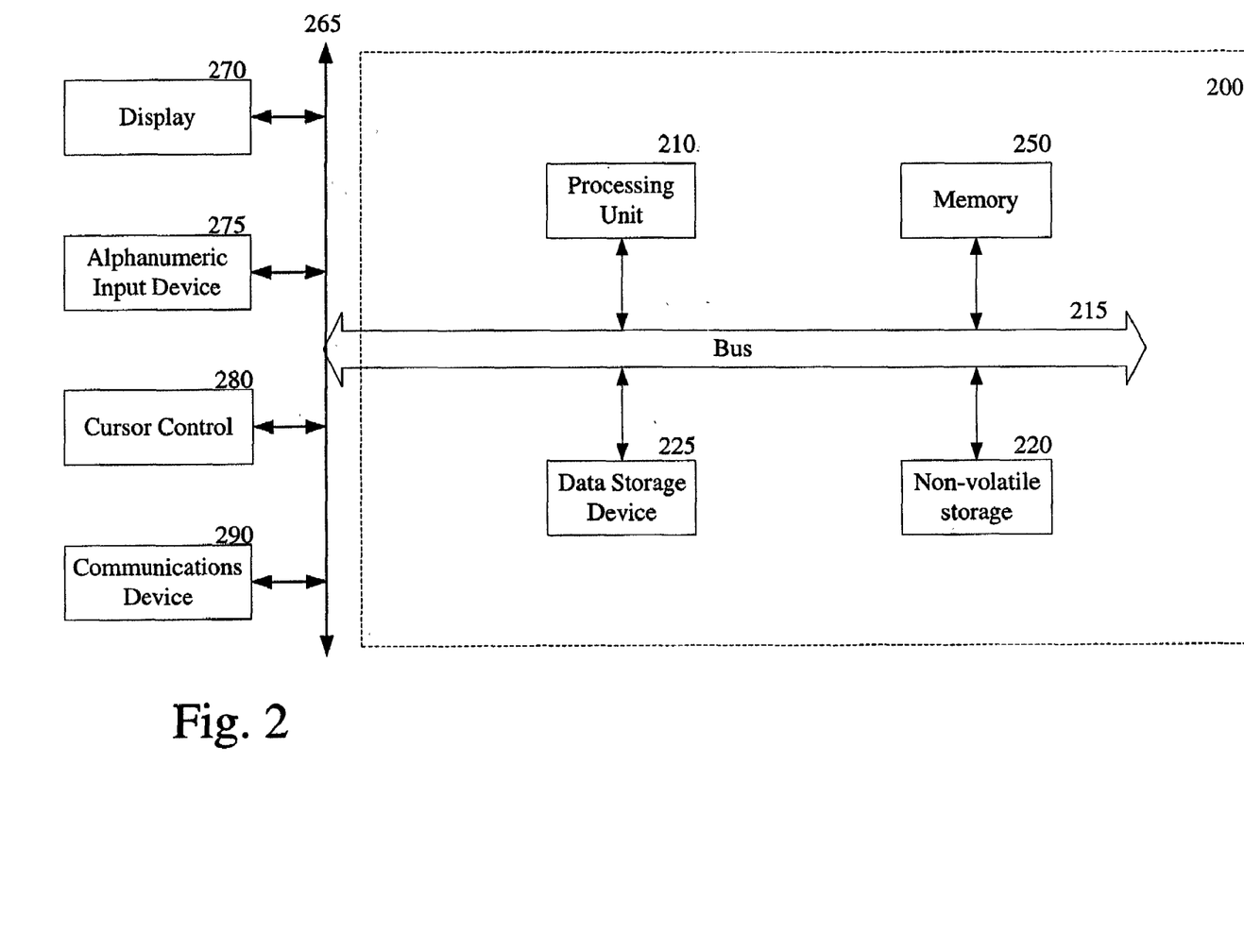
FIG. 2 is one embodiment of a computer system that may be used with the present invention.

FIG. 2 is one embodiment of computer system on which the present invention may be implemented. It will be apparent to those of ordinary skill in the art, however that other alternative systems of various system architectures may also be used.

The computer system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises a read only memory (ROM) and/or static storage device 220 coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 210, and for controlling cursor movement on display device 270.

Another device that may optionally be coupled to computer system 200 is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

For one embodiment, display 270, input device 275, and cursor control 280 may be combined into a single touchscreen. The touch screen display permits data entry using a touch sensitive screen.

It will be appreciated by those of ordinary skill in the art that any configuration of the system may be used for various purposes according to the particular implementation. The control logic or software implementing the present invention can be stored in main memory 220, mass storage device 225, or other storage medium locally or remotely accessible to processor 210. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The software of the present invention may also be embodied in a dedicated appliance containing a subset of the computer hardware components described above. For example, the dedicated appliance may be configured to contain only the bus 215, the processor 210, and memory 250 and/or 225, and a touch screen.

The device may also be configured to include a set of buttons or input signaling components with which a user may select from a set of available options. The dedicated appliance may also be configured to include an output apparatus such as a liquid crystal display (LCD) or display element matrix for displaying information to a user of the dedicated appliance. Conventional methods may be used to implement such a dedicated appliance. The implementation of the present invention for such a device would be apparent to one of ordinary skill in the art given the disclosure of the present invention as provided herein.

Figure 3:
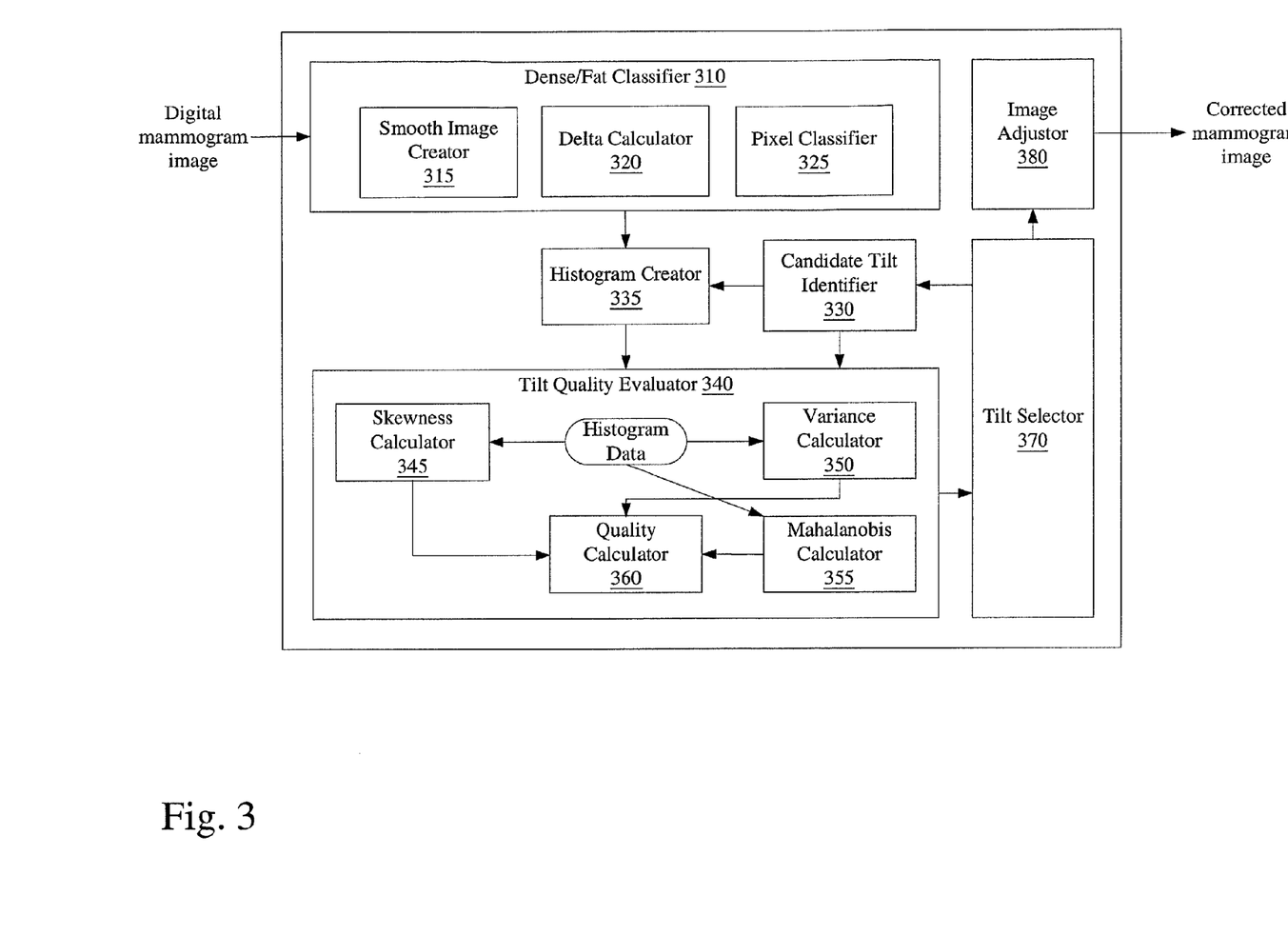
FIG. 3 is a block diagram of one embodiment of the tilt correcting system in accordance with the present invention.

FIG. 3 is a block diagram of one embodiment of the tilt correcting system in accordance with the present invention.

A digitized mammogram 305 is the input to the tilt corrector 300. The digitized mammogram may be obtained from a digital mammography system, or from an analog mammogram that has been digitized.

The dense/fat classifier 310 receives the digital mammogram image 305. The smooth image creator 315 creates a smoothed image of the mammogram. For one embodiment, the smoothed image may set a $\sigma=15$, to generate the smoothed image. The delta calculator 320 calculates a difference between the original image 305 and the smoothed image from the smooth image generator 315. The pixel classifier 325 classifies each pixel as either likely fat or likely not-fat. The pixel classifier evaluates the difference image created by delta calculator 320, to identify concave likely fat pixels and convex likely non-fat pixels. The classified pixels are then passed to the tilt quality evaluator 340.

Candidate tilt identifier 330 identifies a set of candidate tilts for which the tilt quality evaluator 340 calculates quality. For one embodiment, the candidate tilt identifier 330 initially uses a set of "likely" tilts, based on a statistical analysis of previous tilts found, or a preprogrammed set of starting values. These candidate tilts are passed to histogram creator 335.

The histogram creator 335 creates a fat histogram and a non-fat histogram for each of the adjusted images, at each of the candidate tilts.

The tilt quality evaluator 340 receives each of the histograms and determines the quality of the candidate tilt. The quality evaluation is based on features of the histograms of the pixel values in the fat and dense classes. For one embodiment, skewness and variance are used to evaluate the quality. Alternative methods of evaluating the quality of the candidate tilt may be used.

The skewness calculator 345 evaluates the skewness of the fat histogram. The variance calculator 350 calculates the variance of the fat and the non-fat histograms. The Mahalanobis calculator 355 calculates a weighted Mahalanobis value for the system.

The quality calculator 360 calculates a final quality of the tilt candidate. The equations used, for one embodiment, are as described below. In general, the quality calculator 360 evaluates how close to "ideal" the fat distribution appears with the candidate tilt correction. The quality calculator 360 assigns a quality value to each of the candidate tilts proposed by candidate tilt identifier 330.

The tilt selector 370 selects the candidate tilt with the highest quality. The tilt selector 370 furthermore determines whether the current tilt accuracy is at the preferred accuracy. Initially, the accuracy may be at 0.5 degrees. The preferred accuracy may be 0.05 degrees. In that instance, the tilt selector 370 passes the best candidate tilt to the candidate tilt identifier 330. The candidate tilt identifier 330 then generates a new set of candidate tilts, centered around the "best tilt" received from tilt selector 370. If the candidate tilt has the preferred accuracy, its passed to the image adjustor 380.

The image adjustor 380 then adjusts the image using the candidate tilt sent by tilt selector 370. For one embodiment, a wedge of uniform density is added, to compensate for the tilt. For one embodiment, this is done by adjusting the darkness of each pixel by the width of the wedge above the pixel. For three-dimensional corrections, the shape added by image adjustor 380 is the mirror image of the distortion of the plates that originally caused the non-uniformity of compression.

The output of the image adjustor 380 is a corrected mammogram 390. This corrected mammogram image may then be passed on to abnormality detection. The abnormality detection, for one embodiment, is done in accordance with the process described in U.S. Pat. No. 6,266,435. The tilt corrector 300 provides a mammogram image that corresponds to an image taken with parallel non-distorted plates. Therefore, the issues with respect to different darkness corresponding to different densities as well as to different tilts are eliminated. This makes the abnormality detection simpler.

Figure 4:
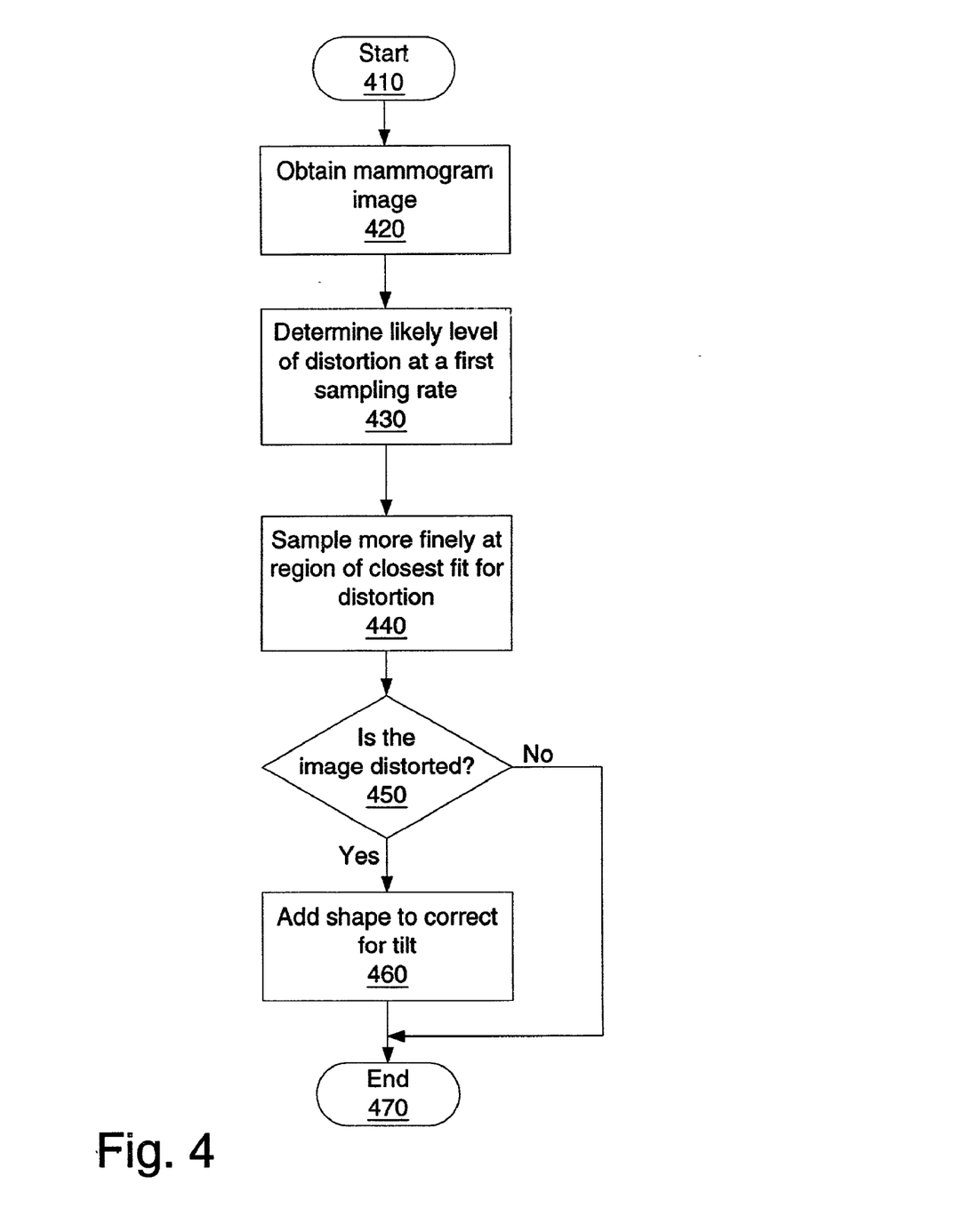
FIG. 4 is an overview flowchart of one embodiment of implementing the tilt correction mechanism.

FIG. 4 is an overview flowchart of one embodiment of implementing the distortion correction mechanism. The process starts at block 410. At block 420, a digitized mammogram image is obtained. For one embodiment, a mammogram may be obtained from a digital imager, which automatically generates a digital mammogram image. For another embodiment, a film-based mammogram image may be passed through a digitizer, to generate a digital mammogram image. One example of a digitizing system that may be used is described in U.S. Pat. No. 5,729,620.

At block 430, a likely level of distortion at a first sampling rate is determined. Various possible distortion levels are evaluated, as will be described in more detail below.

At block 440, a finer sampling at a region of closest fit is made, to determine a more precise distortion. For example, the initial distortion evaluation may be made at 0.5 degree intervals, while the detailed sampling may be made at 0.1 degree intervals. For one embodiment, this process may be repeated at ever finer gradations, until a preferred precision is reached.

At block 450, the process determines whether the distortion was a non-zero distortion. If there is no distortion, i.e. the mammogram plates were parallel and non-warped when the image was obtained, the process ends at block 470, without any correction. If the process finds that there was a distortion, it continues to block 460.

At block 460, a shape is added to correct for the distortion. The shape has the inverse distortion, such that when the shape is added to the image, the image appears to be non-distorted. For a tilt, the shape added is that of a wedge. For one embodiment, adding the wedge comprises calculating a wedge height at each pixel in the image, and adding the corresponding pixel density to the pixel. The process then ends at block 470.

Figure 5:
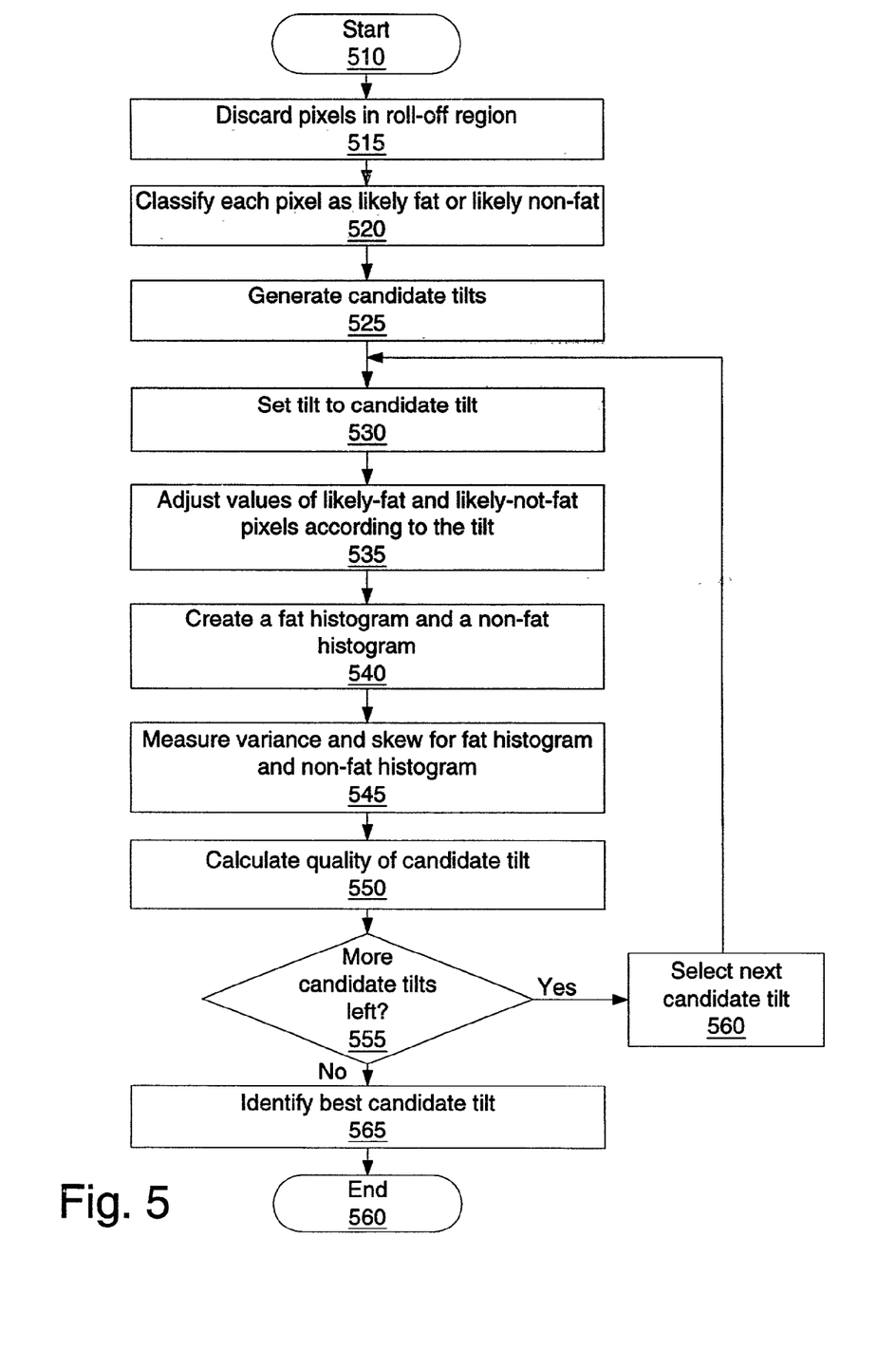
FIG. 5 is a more detailed flowchart of one embodiment of calculating a tilt of a mammogram image.

FIG. 5 is a more detailed flowchart of one embodiment of calculating a tilt of a mammogram image. The process starts at block 510. For one embodiment, the flowchart of FIG. 5 corresponds to block 430 and/or 440 of FIG. 4. Returning to FIG. 5, at block 515, all pixels in the roll-off region are discarded. The roll-off region is the non-compressed region of the breast, corresponding to a narrow area around the skin-line. The roll-off region has unusual characteristics because it is primarily composed of air, skin, and non-compressed fat. Therefore, that area is discarded for the calculation of the tilt.

At block 520, each pixel is classified either as "likely fat" or as "likely non-fat." The darkest pixels in the breast are compressed fat, because fat is the least dense material in the breast. Therefore, compressed fat pixels and their immediate neighborhoods are concave in the pixel value surface, e.g. non-fat areas adjacent to a compressed fat pixel have a higher value. Therefore, all concave areas may be classified as likely fat, while convex areas are classified as likely non-fat. This classification process is described in more detail with respect to FIG. 6. For one embodiment, this may be done for the entire breast area. For another embodiment, this may be done for a smaller area, since the level of tilt is uniform across the entire breast.

At block 525, candidate tilts are generated. For one embodiment, for the initial evaluation, a set number of candidate tilts are generated. For example, the candidate tilts may be set to −1.5°, −1°, −0.5°, +0.5°, +1°, +1.5° in the X-direction. Alternative tilt sets may be used. For one embodiment, the candidate tilts are chosen based on a "typical tilt" that is found. In general, candidate tilts are calculated in units of pixel value per distance. However, for the purposes of this discussion, degrees will be used. The conversion between pixel value per distance and degrees is simple. Note that tilt is along the X and the Y axis. Therefore, the tilt is actually, for example, an X=−1°, Y=−1°, for example. Therefore, for six candidate tilts along each axis, actually 36 candidate tilts are evaluated.

Figure 11A:
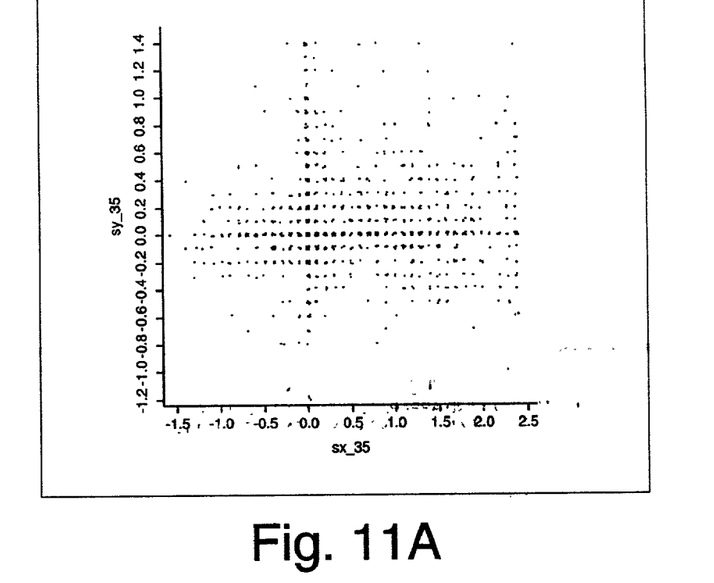
FIGS. 11A–B are an exemplary graph of the distribution of tilt slopes.
Figure 11B:
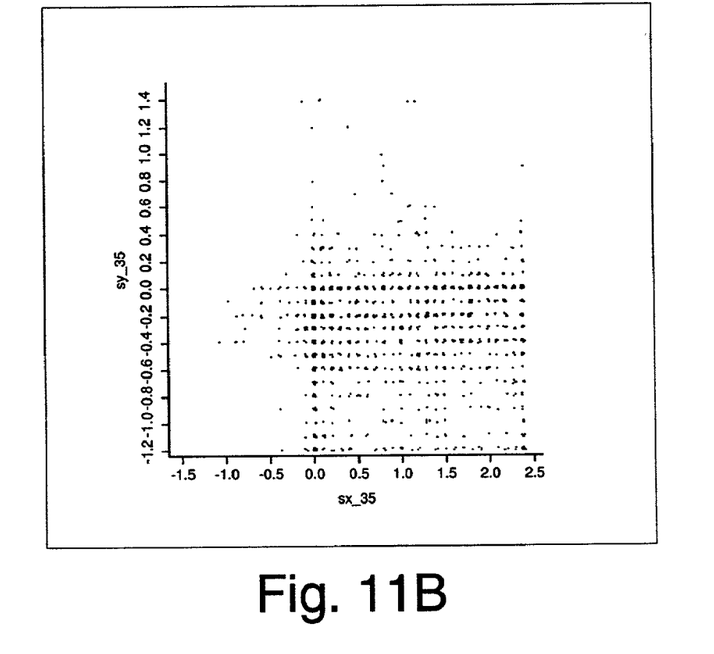

FIGS. 11A and 11B show a distribution of tilt slopes in craniocaudal images and mediolateral oblique images respectively. The units used are pixel values per distance. As can be seen, the tilts generally are centered around 0. As shown in FIG. 11A, the tilt slopes for craniocaudal images are generally positive in the X-direction, and approximately balanced in the Y-direction. The tilt slopes for mediolateral oblique images, as shown in FIG. 11B, are generally positive in the X-direction and negative in the Y-direction. These tilt slope distributions, shown in FIGS. 11A and 11B may be used as the basis for the original candidate tilts.

If this process is being iterated, an appropriate set of candidate tilts may be set. For example, if the initial iteration found that +0.5° was the closest candidate tilt, the second set of candidate tilts may be +0.3°, +0.4°, +0.5°, +0.6°, and +0.7°. Again, the process may be iterated, until the preferred level of tilt-accuracy is reached. For example, a tilt accuracy within 0.05 degrees may be preferred. In that case, two more iterations would be used, to determine for example, that the actual tilt is 6.30 degrees.

At block 530, the tilt is set to a first candidate tilt.

At block 535, the values of the pixels are adjusted in accordance with the current candidate tilt. The adjustment comprises adding a wedge of uniform density to the image, such that each pixel's darkness is adjusted in accordance with the height of the correcting wedge.

Figure 9A:
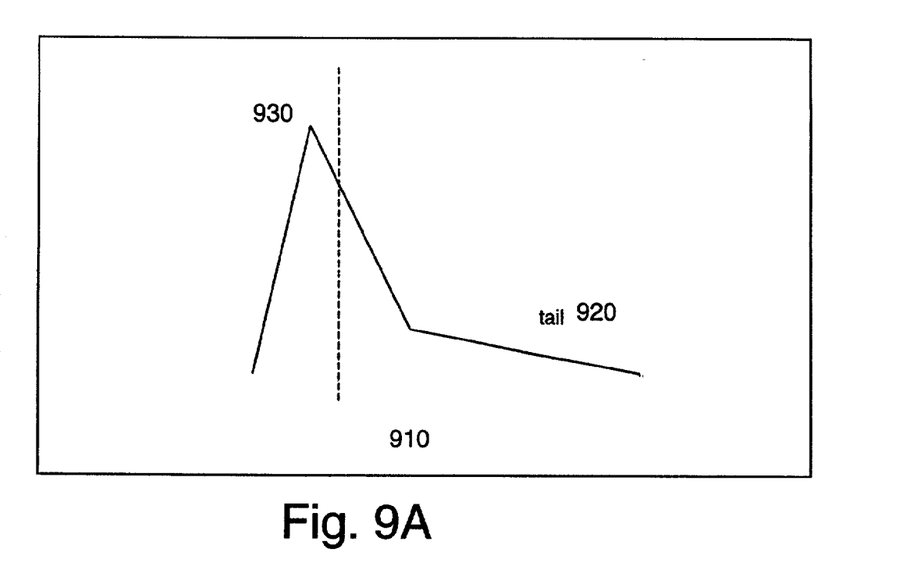
FIGS. 9A–B are images illustrating histograms.
Figure 9B:
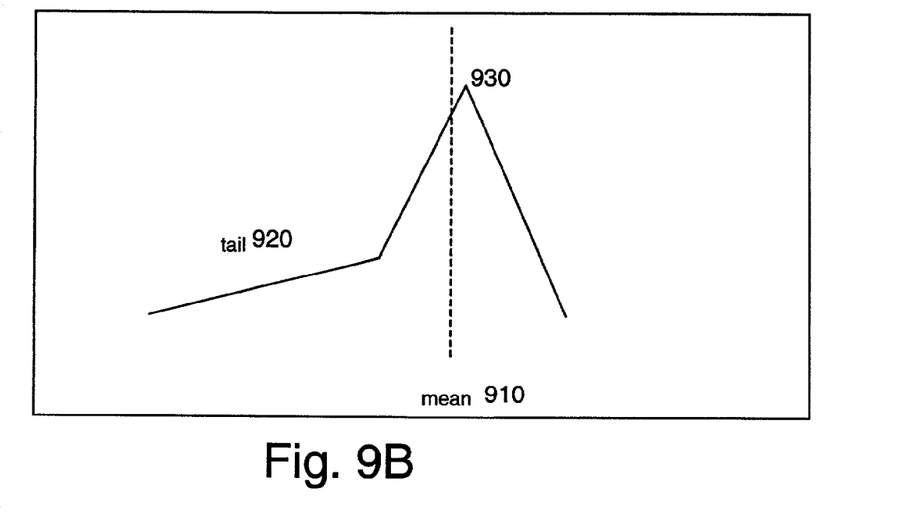

At block 540, fat and non-fat histograms are created. A histogram is a classification scheme in which each pixel is categorized into one of a number of categories. Although the term "histogram" generally refers to an actual graph or image, in this instance, an internal classification is sufficient. FIGS. 9A and B illustrate exemplary histograms.

Returning to FIG. 5, at block 545, the variance and skew of the fat histogram are calculated, and the variance of the non-fat histogram is calculated. FIG. 9A illustrates a histogram with a positive skewness. A positive skewness indicates that a number of the pixels being evaluated fall to the right of the mean 910 in a tail 920, while the "high point" 930 of the graph is to the left of the mean 910. Similarly, a negative skewness—shown in FIG. 9B—illustrates the opposite, with the high point 930 being on the right of the mean, and a tail 920 extending to the left. The variance calculates the distribution from the mean of the various pixels in the fat histogram and the non-fat histogram.

At block 545, the quality of the candidate tilt is evaluated. This is discussed in more detail with respect to FIG. 7, below.

At block 555, the process determines whether there are any more candidate tilts that should be calculated. If so, the process continues to block 560. At block 560, the next candidate tilt is identified. The process then returns to block 530, to set the tilt for evaluation to the new candidate tilt.

If, at block 555, no more candidate tilts are found, the process continues to block 565. At block 565, the best candidate tilt is identified. The best tilt is the one having the highest D ($p_x$, $p_y$), e.g. is quality of the candidate tilt. The process then ends at block 570. As discussed above, this process is initiated for every candidate tilt, and may be iterated to achieve a sufficiently precise tilt evaluation.

Figure 6:
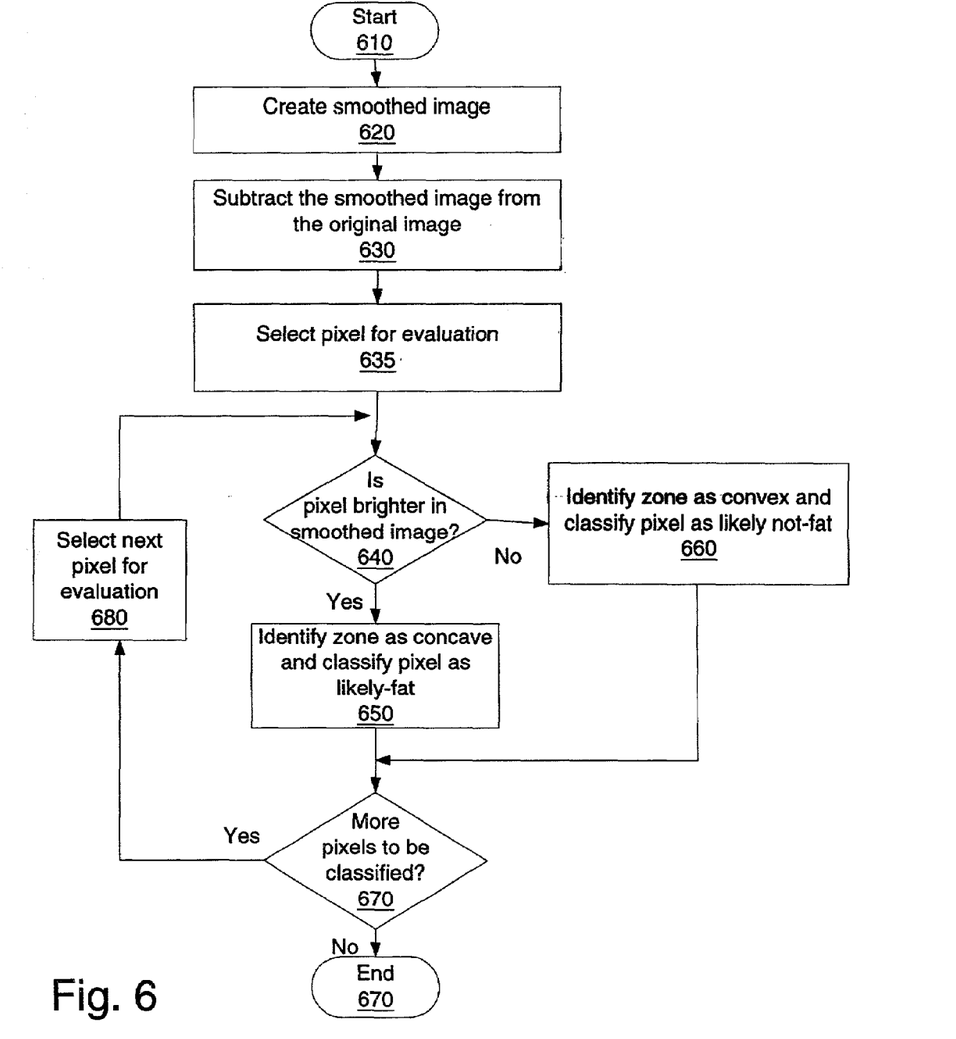
FIG. 6 is a flowchart of one embodiment of classifying a pixel as likely-fat or likely-not-fat.

FIG. 6 is a flowchart of one embodiment of classifying a pixel as likely-fat or likely-not-fat. The process starts at block 610. The process shown in FIG. 6 corresponds to block 520 of FIG. 5.

Figure 10A:
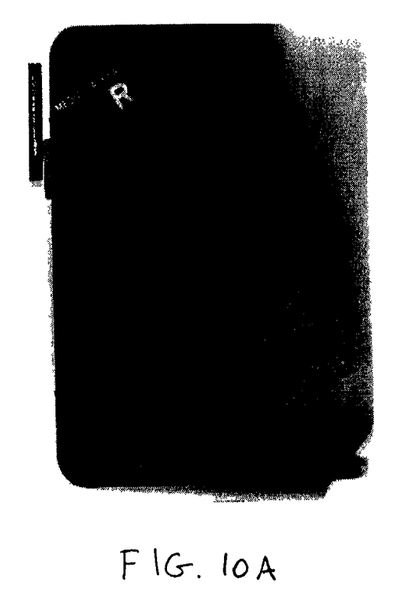
FIGS. 10A–C are images illustrating an original image, a smoothed image, and the difference image.
Figure 10B:
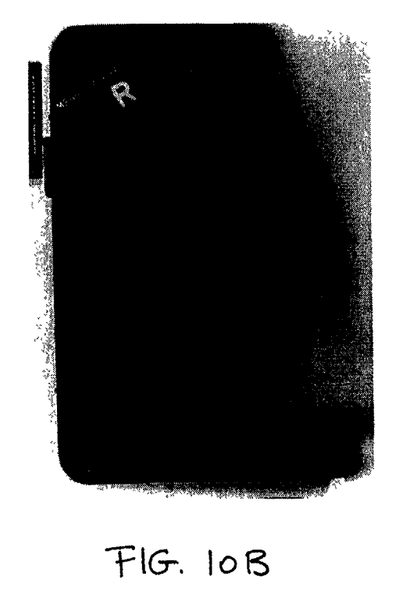
Figure 10C:
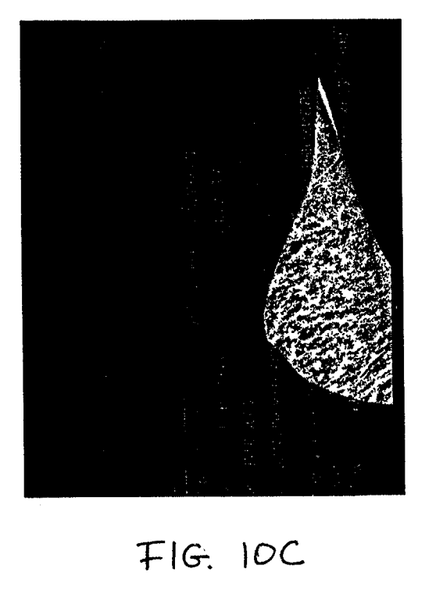

At block 620, a smoothed image is created. FIGS. 10A–B–C illustrate the original image 10A, the smoothed image 10B, and the difference 10C. For one embodiment, the smoothed image uses a fixed value σ=15, for smoothing the image.

Figure 8:
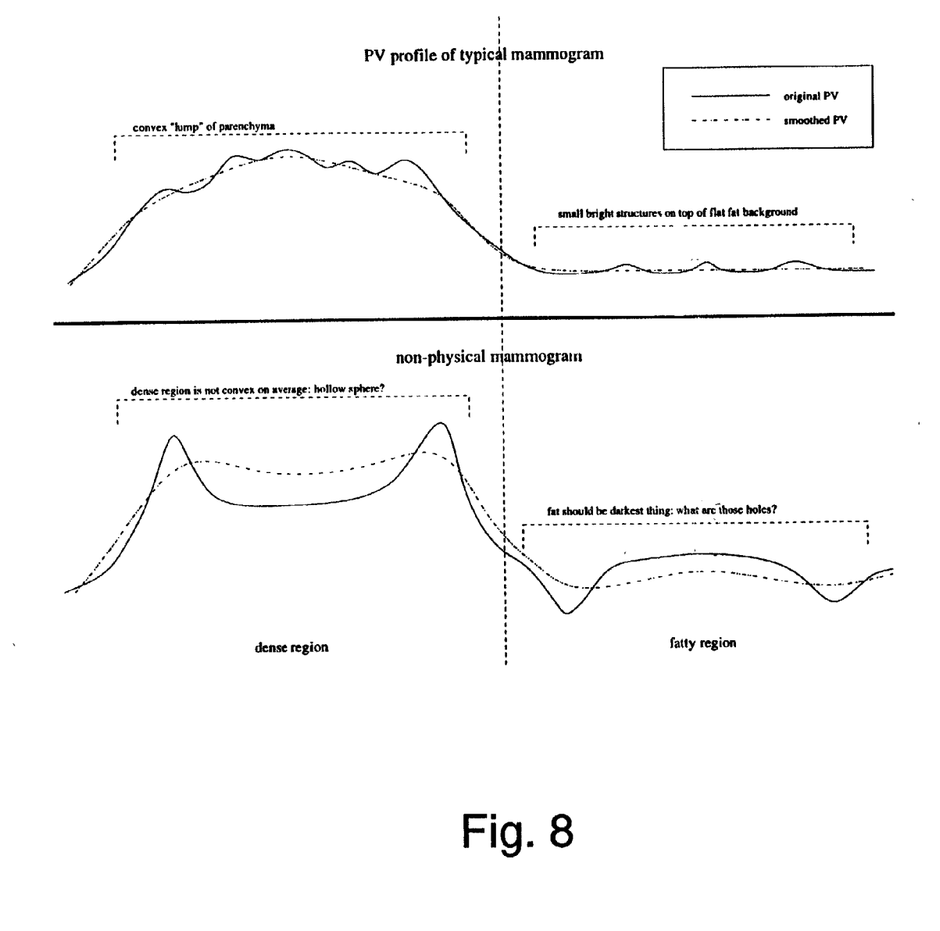
FIG. 8 is an image of a pixel value profile of a typical mammogram.

At block 630, the smoothed image is subtracted from the original image. This produces an image having bright and dark zones. FIG. 8 illustrates exemplary pixel values of a typical mammogram. The smoothed pixel value curve 810 is overlaid over the original pixel value curve 820. As can be seen, the convex humps of the glandular, non-fat, regions 830 extend above the smoothed pixel value curve 810. The concave dips of the fatty regions 840 dip below the smoothed pixel value curve 810.

Returning to FIG. 6, at block 640, for a pixel, the process determines whether the pixel is brighter in the smoothed image or in the original image. If the image is brighter in the original image, the delta (original image minus smoothed image) is bright, while if the smoothed image is brighter, the delta is dark.

If the pixel is brighter in the smoothed image, the process continues to block 650. At block 650, the process determines that the pixel is concave, and should be classified as likely fat. If the pixel is not brighter in the smoothed image, the process continues to block 660. At block 660, the pixel is identified as convex, and classified as likely not-fat. The process then continues to block 670.

At block 670, the process determines whether there are any more pixels to be classified. For one embodiment, only a small region of the breast area is evaluated in this way. Thus, the process tests whether there are any more pixels within the evaluation area, for classification. If so, the process continues to block 680. At block 680, the process advances to the next pixel for evaluation. If there are no more pixels, the process ends at block 690.

Figure 7:
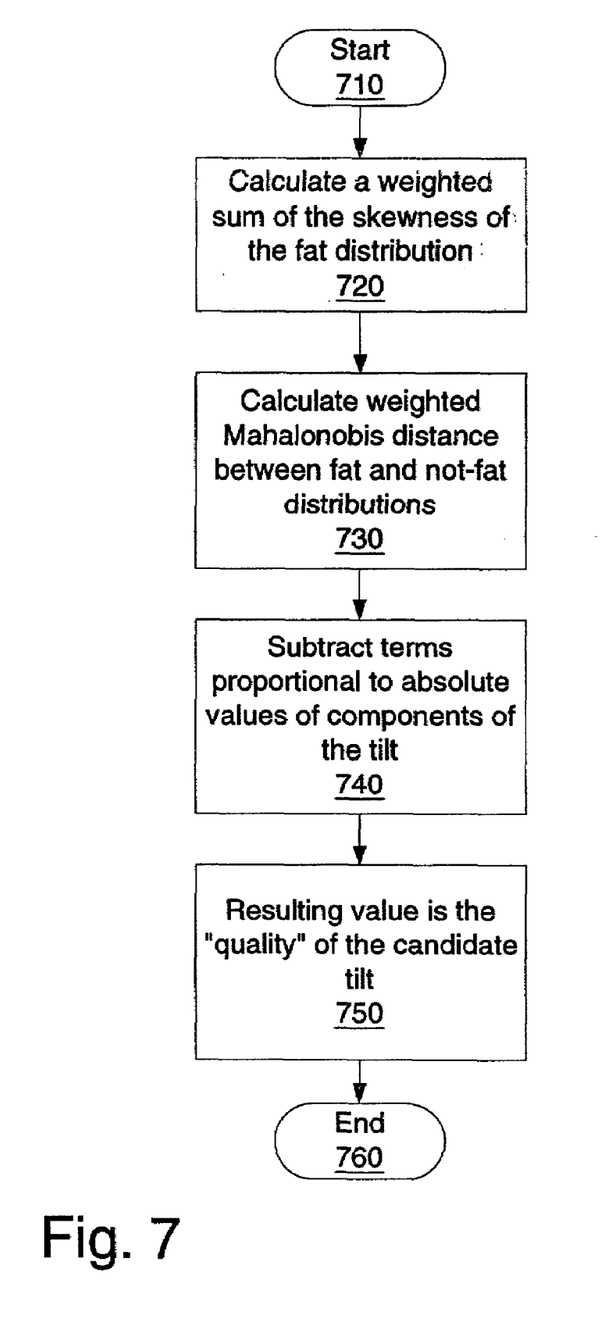
FIG. 7 is a flowchart of one embodiment of determining a quality of a candidate tilt.

FIG. 7 is a flowchart of one embodiment of determining a quality of a candidate tilt. The process starts at block 710. The process of FIG. 10 corresponds to block 550 of FIG. 5.

At block 720, the weighted sum of the skewness of the fat distribution is calculated.

At block 730, the weighted Mahalanobis distance between the fat and non-fat distributions. A Mahalanobis distance is defined as the difference of means divided by the square root of the sum of the variances. A weighted Mahalanobis distance uses the square root of a weighted sum of the variances of the distributions as the denominator.

At block 740, the quality is adjusted to favor smaller tilts, by subtracting terms proportional to the absolute values of the components of the tilt under consideration. At block 750, the resulting value is designated as the "quality of the candidate tilt.

For one embodiment, the following equation is used:

$$D(p_x, p_y) = \frac{m_d - m_f}{\sqrt{(0.7\mathrm{var}_f + 0.3\mathrm{var}_d)}} + 0.5\mathit{inf}(0, \mathit{skew}_f) - 0.1|p_x| - 0.1|p_y|$$

where:

D ($p_x$, $p_y$) is the quality of the candidate tilt.

$p_x$ and $p_y$ are the slope of the correction plane in the x and y directions;

$m_d$ and $m_f$ are the means of the dense (non-fat) and fat regions;

$\mathrm{var}_d$ and $\mathrm{var}_f$ are the variances of the dense and fat regions; and $\mathit{skew}_f$ is the skewness of the fat histogram.

Thus, the first term represents the weighted Mahalanobis distance, giving more weight to the variance of the fat distribution, which is narrower after correction. This is because the width of the dense tissue histogram may vary because pixels represent different fractions of dense tissue. The histogram of the fat tissue has a steep slope even if initial segmentation is poor because most mammograms have a large area that is primarily composed of fatty tissue.

One example may be to correct for tilt in 200 micron images. In a first pass, the histograms are computed with a sampling interval of 1.6 mm (8 pixels), and the entire parameter space is coarsely sampled. The maximum of D ($p_x$, $p_y$) is computed. In a small region around the first identified tilt, the second search algorithm is performed. A sampling interval of 400 microns (2 pixels) is used, and the parameter space is sampled with a step size of 0.1. This example mechanism processes a standard 200 micron image in approximately one second. Thus, the tilt correction mechanism described herein may be implemented in real time.

In this way, the quality of the candidate tilt is evaluated. By comparing the qualities of each candidate tilt, the candidate tilt with the "best quality" may be chosen.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of correcting for a tilt in a mammogram, the method comprising:

classifying pixels as either likely fat or likely not-fat;

identifying a candidate tilt;

calculating a histogram of the likely fat and the likely not-fat pixels at the candidate tilt; and evaluating a quality of the candidate tilt based on features of the histograms of pixel values in the fat and the not-fat tissue classes.

2. The method of claim 1, wherein evaluating the quality of the candidate tilt based on the features of the histograms comprises:

evaluating a quality of the candidate tilt based on a skew and variance of the histograms.

3. The method of claim 2, wherein evaluating the quality of the candidate tilt comprises calculating a weighted Mahalanobis distance between the likely fat and the likely not-fat distributions to determine a quality of the candidate tilt.

4. The method of claim 3, wherein evaluating the quality of the candidate tilt further comprises giving more weight to the variance of the fat distribution in the weighted Mahalanobis distance calculation.

5. The method of claim 3, wherein evaluating the quality of the candidate tilt further comprises using the skewness of the fat histogram to give a preference to distributions that are not skewed to the negative side.

6. The method of claim 3, wherein evaluating the quality of the candidate tilt further comprises adjusting the result to favor smaller tilts.

7. The method of claim 3, wherein evaluating the quality of the candidate tilt comprises applying the equation:

$$D(p_x, p_y) = \frac{m_d - m_f}{\sqrt{(0.7\text{var}_f + 0.3\text{var}_d)}} + 0.5inf(0, skew_f) - 0.1|p_x| - 0.1|p_y|.$$

8. The method of claim 1, wherein identifying the candidate tilt comprises identifying a first set of candidate tilts, based on an expected tilt distribution.

9. The method of claim 8, further comprising identifying a subsequent set of candidate tilts, based on the best tilt identified in a previous iteration, to provide more accurate tilt.

10. The method of claim 1, wherein classifying pixels as either likely fat or likely not-fat comprises:
    generating a smoothed image;
    subtracting the smoothed image from an original image; and
    determining whether pixels are convex to classify the pixels as likely not-fat, or concave to classify the pixels as likely fat.

11. The method of claim 10, wherein the pixels are classified individually.

12. An apparatus to correct a tilt in a mammogram comprising:
    a dense/fat classifier to classify pixels as either likely fat or likely not-fat;
    a candidate tilt identifier to identify a candidate tilt; and
    a histogram creator to calculate a histogram of the likely fat and the likely not-fat pixels at the candidate tilt; and
    a tilt quality evaluator to evaluate a quality of the candidate tilt based on features of the histograms of pixel values in the fat and the dense tissue classes.

13. The apparatus of claim 12, wherein the tilt quality evaluator uses a skew and variance of the histograms to evaluate the tilt quality.

14. The apparatus of claim 13, wherein the tilt quality evaluator further comprises a Mahalanobis calculator to calculate a weighted Mahalanobis distance between the likely fat and the likely not-fat distributions to determine a quality of the candidate tilt.

15. The apparatus of claim 14, wherein the tilt quality evaluator further comprises a quality calculator to give more weight to the variance of the fat distribution in the weighted Mahalanobis distance calculation.

16. The apparatus of claim 14, wherein the tilt quality evaluator further comprises a quality calculator to use the skewness of the fat histogram to give a preference to distributions that are not skewed to the negative side.

17. The apparatus of claim 14, wherein the tilt quality evaluator further comprises a quality calculator to adjust the result to favor smaller tilts.

18. The apparatus of claim 14, the tilt quality evaluator evaluates the tilt quality using the following equation:

$$D(p_x, p_y) = \frac{m_d - m_f}{\sqrt{(0.7\text{var}_f + 0.3\text{var}_d)}} + 0.5inf(0, skew_f) - 0.1|p_x| - 0.1|p_y|.$$

19. The apparatus of claim 12, wherein the candidate tilt identifier to identify a first set of candidate tilts, based on an expected tilt distribution.

20. The apparatus of claim 19, the candidate tilt identifier further to identify a subsequent set of candidate tilts, based on the best tilt identified in a previous iteration, to provide more accurate tilt.

21. The apparatus of claim 12, wherein the dense/fat classifier comprises:
    a smooth image generator to generate a smoothed image;
    a delta calculator to subtract the smoothed image from an original image; and
    a pixel classifier to determine whether pixels are convex to classify the pixels as likely not-fat, or concave to classify the pixels as likely fat.

22. The apparatus of claim 21, wherein the pixels are classified individually.

23. An apparatus comprising:
    an image receiver to receive a digitized mammogram image, the digitized mammogram image representing a mammogram taken with non-parallel imaging plates;
    a tilt corrector to evaluate a plurality of candidate tilts designed to correct for the non-parallel imaging plates;
    an image adjustor to adjust the digitized mammogram image in accordance with a best candidate tilt; and
    an output mechanism to output the corrected mammogram image, the corrected mammogram image used for computer aided diagnosis to detect abnormalities in the corrected mammogram image.

24. The apparatus of claim 23, wherein the tilt corrector comprises:
    a dense/fat classifier to classify pixels as either likely fat or likely not-fat;
    a candidate tilt identifier to identify a candidate tilt; and
    a histogram creator to calculate a histogram of the likely fat and the likely not-fat pixels at the candidate tilt; and
    a tilt quality evaluator to evaluate a quality of the candidate tilt based on features of the histograms of pixel values in the fat and the dense tissue classes.

25. The apparatus of claim 24 wherein the tilt quality evaluator evaluates the quality of the candidate tilt based on a skew and variance of the histograms.

* * * * *